United States Patent
Fard et al.

(10) Patent No.: US 12,089,653 B2
(45) Date of Patent: Sep. 17, 2024

(54) SMOKING SUBSTITUTE DEVICE

(71) Applicant: Imperial Tobacco Limited

(72) Inventors: Daniel Fard, Liverpool (GB); Oliver Talbot, Liverpool (GB)

(73) Assignee: Imperial Tobacco Limited, Bristol (GB)

( * ) Notice: Subject to any disclaimer, the term of this patent is extended or adjusted under 35 U.S.C. 154(b) by 1060 days.

(21) Appl. No.: 17/001,185

(22) Filed: Aug. 24, 2020

(65) Prior Publication Data

US 2021/0068466 A1 Mar. 11, 2021

Related U.S. Application Data (63) Continuation of application No. PCT/EP2019/053493, filed on Feb. 13, 2019.

(30) Foreign Application Priority Data

Feb. 26, 2018 (GB) .................................... 1803024

(51) Int. Cl.
| | |
|---|---|
| *A24F 40/53* | (2020.01) |
| *A24F 40/57* | (2020.01) |
| *A24F 40/65* | (2020.01) |
| *H04L 67/141* | (2022.01) |
| *A24F 40/10* | (2020.01) |

(52) U.S. Cl.
CPC .............. *A24F 40/53* (2020.01); *A24F 40/57* (2020.01); *A24F 40/65* (2020.01); *H04L 67/141* (2013.01); *A24F 40/10* (2020.01)

(58) Field of Classification Search
CPC .......... A24F 40/53; A24F 40/57; A24F 40/65; A24F 40/10; H04L 67/141; H04M 1/72412
See application file for complete search history.

(56) References Cited

U.S. PATENT DOCUMENTS 9,864,947 B1 * 1/2018 Sur .................. G06K 19/07756
9,913,493 B2 * 3/2018 Worm .................... A45C 13/16
(Continued)

FOREIGN PATENT DOCUMENTS

| EP | 3 275 325 A2 | 1/2018 |
|---|---|---|
| GB | 2533137 A | 6/2016 |

(Continued)

OTHER PUBLICATIONS

International Search Report, mailed Apr. 26, 2019, in PCT/EP2019/053493, filed Feb. 13, 2019.
(Continued)

*Primary Examiner* — Travis S Chambers
(74) *Attorney, Agent, or Firm* — DUNLAP CODDING, P.C.

(57) ABSTRACT

A smoking substitute device having a wireless interface configured to communicate wirelessly with a computing device. The smoking substitute device may be able to send information relating to usage of the smoking substitute device wirelessly to the computing device using the wireless interface and/or to change its behaviour based on instructions from the computing device that have been received wirelessly at the wireless interface. A system including the smoking substitute device is also disclosed.

8 Claims, 3 Drawing Sheets

(56) References Cited

U.S. PATENT DOCUMENTS

| | | |
|---|---|---|
| 10,045,568 B2 * | 8/2018 | Monsees .............. H05B 3/44 |
| 2011/0265806 A1 | 11/2011 | Alarcon et al. |
| 2015/0245654 A1 | 9/2015 | Memari et al. |
| 2016/0331037 A1 | 11/2016 | Cameron |
| 2017/0303594 A1 | 10/2017 | Cameron et al. |
| 2017/0354183 A1 | 12/2017 | Liu |
| 2018/0043114 A1 | 2/2018 | Adam et al. |

FOREIGN PATENT DOCUMENTS

| | | |
|---|---|---|
| GB | 2542012 A | 3/2017 |
| WO | WO 2014/195805 A2 | 12/2014 |
| WO | WO 2017/055802 A1 | 4/2017 |
| WO | WO 2017/205692 A1 | 11/2017 |

OTHER PUBLICATIONS

Written Opinion of the International Searching Authority, mailed Apr. 26, 2019, in PCT/EP2019/053493, filed Feb. 13, 2019.
UKIPO Combined Search and Examination Report (GB1803024.7), dated Jun. 27, 2018, 10 pages.

* cited by examiner

SMOKING SUBSTITUTE DEVICE

CROSS-REFERENCE TO RELATED APPLICATIONS/INCORPORATION BY REFERENCE STATEMENT

The present patent application is a continuation of International Application No. PCT/EP2019/053493, filed Feb. 13, 2019; which claims priority to the patent application identified by GB Serial No. 1803024.7, filed on Feb. 26, 2018. The entire contents of the above-referenced patent(s)/patent application(s) are hereby expressly incorporated by reference herein.

TECHNICAL FIELD

The present disclosure relates to a smoking substitute device and a system including a smoking substitute device.

BACKGROUND

The smoking of tobacco is generally considered to expose a smoker to potentially harmful substances. It is generally thought that a significant amount of the potentially harmful substances are generated through the heat caused by the burning and/or combustion of the tobacco and the constituents of the burnt tobacco in the tobacco smoke itself.

Combustion of organic material such as tobacco is known to produce tar and other potentially harmful by-products. There have been proposed various smoking substitute devices in order to avoid the smoking of tobacco.

Such smoking substitute devices can form part of nicotine replacement therapies aimed at people who wish to stop smoking and overcome a dependence on nicotine.

Smoking substitute devices may comprise electronic systems that permit a user to simulate the act of smoking by producing an aerosol, also referred to as a "vapour", that is drawn into the lungs through the mouth (inhaled) and then exhaled. The inhaled aerosol typically bears nicotine and/or flavourings without, or with fewer of, the odour and health risks associated with traditional smoking.

In general, smoking substitute devices are intended to provide a substitute for the rituals of smoking, whilst providing the user with a similar experience and satisfaction to those experienced with traditional smoking and tobacco products.

The popularity and use of smoking substitute devices has grown rapidly in the past few years. Although originally marketed as an aid to assist habitual smokers wishing to quit tobacco smoking, consumers are increasingly viewing smoking substitute devices as desirable lifestyle accessories. Some smoking substitute devices are designed to resemble a traditional cigarette and are cylindrical in form with a mouthpiece at one end. Other smoking substitute devices do not generally resemble a cigarette (for example, the smoking substitute device may have a generally box-like form).

There are a number of different categories of smoking substitute devices, each utilising a different smoking substitute approach. A smoking substitute approach corresponds to the manner in which the substitute system operates for a user.

One approach for a smoking substitute device is the so-called "vaping" approach, in which a vapourisable liquid, typically referred to (and referred to herein) as "e-liquid", is heated by a heating device to produce an aerosol vapour which is inhaled by a user. An e-liquid typically includes a base liquid as well as nicotine and/or flavourings. The resulting vapour therefore typically contains nicotine and/or flavourings. The base liquid may include propylene glycol and/or vegetable glycerin.

A typical vaping smoking substitute device includes a mouthpiece, a power source (typically a battery), a tank for containing e-liquid, as well as a heating device. In use, electrical energy is supplied from the power source to the heating device, which heats the e-liquid to produce an aerosol (or "vapour") which is inhaled by a user through the mouthpiece.

Vaping smoking substitute devices can be configured in a variety of ways. For example, there are "closed system" vaping smoking substitute devices which typically have a sealed tank and heating element which is pre-filled with e-liquid and is not intended to be refilled by an end user. One subset of closed system vaping smoking substitute devices include a main body which includes the power source, wherein the main body is configured to be physically and electrically coupled to a consumable including the tank and the heating element. In this way, when the tank of a consumable has been emptied, the main body can be reused by connecting it to a new consumable. Another subset of closed system vaping smoking substitute devices are completely disposable, and intended for one-use only.

There are also "open system" vaping smoking substitute devices which typically have a tank that is configured to be refilled by a user, so the device can be used multiple times.

An example vaping smoking substitute device is the Myblu™ e-cigarette. The Myblu™ e-cigarette is a closed system device which includes a main body and a consumable. The main body and consumable are physically and electrically coupled together by pushing the consumable into the main body. The main body includes a rechargeable battery. The consumable includes a mouthpiece, a sealed tank which contains e-liquid, as well as a heating device, which for this device is a heating filament coiled around a portion of a wick which is partially immersed in the e-liquid. The device is activated when a microprocessor on board the main body detects a user inhaling through the mouthpiece. When the device is activated, electrical energy is supplied from the power source to the heating device, which heats e-liquid from the tank to produce a vapour which is inhaled by a user through the mouthpiece.

Another example vaping smoking substitute device is the blu PRO™ e-cigarette. The blu PRO™ e-cigarette is an open system device which includes a main body, a (refillable) tank, and a mouthpiece. The main body and tank are physically and electrically coupled together by screwing one to the other. The mouthpiece and refillable tank are physically coupled together by screwing one of the other, and detaching the mouthpiece from the refillable tank allows the tank to be refilled with e-liquid. The device is activated by a button on the main body. When the device is activated, electrical energy is supplied from the power source to a heating device, which heats e-liquid from the tank to produce a vapour which is inhaled by a user through the mouthpiece.

Another approach for a smoking substitute device is the so-called "heat not burn" ("HNB") approach in which tobacco (rather than e-liquid) is heated or warmed to release vapour. The tobacco may be leaf tobacco or reconstituted tobacco. The vapour may contain nicotine and/or flavourings. In the HNB approach the intention is that the tobacco is heated but not burned, i.e. does not undergo combustion.

A typical HNB smoking substitute device may include a main body and a consumable. The consumable may include the tobacco material. The main body and consumable may be configured to be physically coupled together. In use, heat may be imparted to the tobacco material by a heating device that is typically located in the main body, wherein airflow through the tobacco material causes moisture in the tobacco material to be released as vapour. A vapour may be formed from a carrier in the tobacco material (this carrier may for example include propylene glycol and/or vegetable glycerin) and additionally volatile compounds released from the tobacco. The released vapour may be entrained in the airflow drawn through the tobacco.

As the vapour passes through the smoking substitute device (entrained in the airflow) from an inlet to a mouthpiece (outlet), the vapour cools and condenses to form an aerosol (also referred to as a vapour) for inhalation by the user. The aerosol will normally contain the volatile compounds.

In HNB smoking substitute devices, heating as opposed to burning the tobacco material is believed to cause fewer, or smaller quantities, of the more harmful compounds ordinarily produced during smoking. Consequently, the HNB approach may reduce the odour and/or health risks that can arise through the burning, combustion and pyrolytic degradation of tobacco.

An example of the HNB approach is the IQOS™ smoking substitute device from Philip Morris Ltd. The IQOS™ smoking substitute device uses a consumable, including reconstituted tobacco located in a wrapper. The consumable includes a holder incorporating a mouthpiece. The consumable may be inserted into a main body that includes a heating device. The heating device has a thermally conductive heating knife which penetrates the reconstituted tobacco of the consumable, when the consumable is inserted into the heating device. Activation of the heating device heats the heating element (in this case a heating knife), which, in turn, heats the tobacco in the consumable. The heating of the tobacco causes it to release nicotine vapour and flavourings which may be drawn through the mouthpiece by the user through inhalation.

A second example of the HNB approach is the device known as "Glo"™ from British American Tobacco p.l.c. Glo™ comprises a relatively thin consumable. The consumable includes leaf tobacco which is heated by a heating device located in a main body. When the consumable is placed in the main body, the tobacco is surrounded by a heating element of the heating device. Activation of the heating device heats the heating element, which, in turn, heats the tobacco in the consumable. The heating of the tobacco causes it to release nicotine vapour and flavourings which may be drawn through the consumable by the user through inhalation. The tobacco, when heated by the heating device, is configured to produce vapour when heated rather than when burned (as in a smoking apparatus, e.g. a cigarette). The tobacco may contain high levels of aerosol formers (carrier), such as vegetable glycerine ("VG") or propylene glycol ("PG").

The present inventor(s) have observed that most smoking substitute devices currently on the market are configured to operate in isolation of other devices, which limits the functions the smoking substitute devices can perform.

The present disclosure has been devised in light of the above considerations.

BRIEF DESCRIPTION OF THE DRAWINGS

Embodiments and experiments illustrating the principles of the present disclosure will now be discussed with reference to the accompanying figures in which.

DETAILED DESCRIPTION

In a first non-limiting aspect, the present disclosure provides a smoking substitute device (or "cigarette replacement device") having a wireless interface configured to communicate wirelessly with a computing device.

In this way, the smoking substitute device may be able to send information relating to usage of the smoking substitute device wirelessly to the computing device using the wireless interface and/or to change its behaviour based on instructions from the computing device that have been received wirelessly at the wireless interface.

In certain non-limiting embodiments, the smoking substitute device is configured to send information relating to usage of the smoking substitute device wirelessly to the computing device using the wireless interface.

The information relating to usage of the smoking substitute device may include statistics relating to usage of the smoking substitute device, e.g. which could then be presented to a user via the computing device (alternatively, usage statistics could be calculated at the computing device based on information received from the smoking substitute device).

The information relating to usage of the smoking substitute device may include information relating to or describing a number of times the smoking substitute device has been activated. This information could for example include a number of times the device has been activated starting from a first activation by a user, and/or a number of times the device has been activated since the device was last charged.

The information relating to usage of the smoking substitute device may include information relating to or describing one or more lengths of time for which the smoking substitute device has been activated. This information could for example include an average length of time the smoking substitute device has been activated by a user (per activation), and/or a total length of time the smoking substitute device has been activated by a user (over all activations).

The information relating to usage of the smoking substitute device may include information relating to or describing one or more flavours used with the smoking substitute device. This information could for example include an indication of the/each flavour of consumable material (e.g. e-liquid or tobacco) used with the smoking substitute device.

If the smoking substitute device includes a main body for use with a consumable (see below), the information relating to usage of the smoking substitute device may include information associated with the consumable, e.g. information relating to or describing one or more flavours of consumable used with the smoking substitute device. This information could for example include an indication of the/each flavour of consumable material (e.g. e-liquid or tobacco) in the consumables that have been used with the smoking substitute device.

By way of example, the smoking substitute device may be able to determine the flavour of consumable used with the smoking substitute device via a machine readable component (e.g. an RFID tag) provided with the consumable.

In this case, the main body may include a reader (e.g. an RFID reader) for reading a machine readable component (e.g. an RFID tag) provided with the consumable. In certain non-limiting embodiments, the machine readable component is included in the consumable, but could instead be provided in packaging for the consumable. In certain non-limiting embodiments, the reader is configured to read a machine readable component included in the consumable when (optionally only when) the consumable is physically coupled to the main body.

The information relating to usage of the smoking substitute device may include information relating to or describing the time at which one or more events occur on the smoking substitute device. The one or more events could for example include the time at which each activation of the smoking substitute device occurs, and/or a time at which each charging of the smoking substitute device occurs (if the smoking substitute device includes a rechargeable battery). The smoking substitute device may include a clock for use in determining the time at which one or more events occur.

In certain non-limiting embodiments, the smoking substitute device is configured to change its behaviour based on instructions from the computing device that have been received wirelessly at the wireless interface.

The instructions from the computing device may include instructions for changing one or more configuration settings of the smoking substitute device (some examples of which are discussed below).

The instructions from the computing device may include instructions for controlling the behaviour of a heating device included in the smoking substitute device. These instructions could for example include instructions for changing a voltage applied to a heating element when the smoking substitute device is activated.

The instructions from the computing device may include instructions for changing a mode of operation of the smoking substitute device. These instructions could for example include instructions for putting the smoking substitute device in a battery saving mode of operation. The battery saving mode of operation could for example reduce battery use by the smoking substitute device per activation of the device, e.g. compared with a standard mode of operation. Battery usage could be reduced, for example, by reducing activation length or changing a voltage applied to a heating element when the smoking substitute device is activated.

The instructions from the computing device may include instructions for resetting the smoking substitute device.

The instructions from the computing device may include instructions for changing the behaviour of a light included in the smoking substitute device. These instructions could for example include instructions for disabling the light.

The instructions from the computing device may include instructions for changing the behaviour of an airflow sensor for detecting airflow in the smoking substitute device. These instructions could for example include instructions for changing the sensitivity of the airflow sensor, e.g. according to a user's preference.

The instructions from the computing device may include instructions for controlling wireless settings of the smoking substitute device, i.e. settings which relate to how the smoking substitute device communicates wirelessly with computing devices using the wireless interface. These instructions could for example include instructions for changing the name of the smoking substitute device, for making the smoking substitute device discoverable or non-discoverable, and/or how often the smoking substitute device attempts to connect/communicate with the computing device.

The instructions from the computing device may be for changing the behaviour of the smoking substitute device based on information sent to the computing device by the smoking substitute device, e.g. if the application determines based on information sent to the mobile device by the smoking substitute device that one or more criteria have been met. Examples of how this could be achieved are described in more detail below, where the computing device is a mobile device.

The smoking substitute device may include: a control unit for controlling operation of the smoking substitute device; and a memory for storing information relating to operation of the smoking substitute device.

If the smoking substitute device includes a main body for use with a consumable, the control unit and memory are, for example (but not by way of limitation), included in the main body.

The control unit may control the smoking substitute device to perform any of the operations described above or herein.

The control unit may be configured to record information relating to usage of the smoking substitute device (see above) in the memory.

The wireless interface may be any suitable interface which allows the smoking substitute device to communicate wirelessly with a computing device.

For example, the wireless interface may be a Bluetooth™ interface configured to communicate wirelessly with computing devices according to the Bluetooth™ wireless technology standards. Of course, other wireless technology standards exist that could equally be used, e.g. a standard used for wireless local area networking such as the IEEE 802.11 standards.

The wireless interface may be configured to communicate wirelessly with a computing device intermittently, e.g. such that a user may only be periodically able to connect with the computing device. This may help to save battery.

The smoking substitute device may be a vaping smoking substitute device or a heat not burn smoking substitute device. Such devices can be configured in a variety of ways, e.g. as described herein.

The smoking substitute device may include a main body and a consumable.

The computing device could be any computing device able to communicate wirelessly with the smoking substitute device, e.g. a mobile device (such as a mobile phone or tablet) or a general purpose computer.

In a second non-limiting aspect, the present disclosure provides a system for managing a smoking substitute device, including: a smoking substitute device according to the first non-limiting aspect of the present disclosure; and a mobile device, wherein the smoking substitute device is configured to communicate wirelessly (e.g. via Bluetooth™) with an application installed on the mobile device via a wireless interface on the mobile device.

The system may include an application server, e.g. which may be controlled by a manufacturer of the smoking substitute device.

The application on the mobile phone may be configured to communicate with the application server, via a network, e.g. as described below.

The application installed on the mobile device may be configured to display information relating to usage of the smoking substitute device. The displayed information may include information as received from the smoking substitute device (see above for examples) and/or information derived from information as received from the smoking substitute device. The displayed information may include statistics relating to usage of the smoking substitute device.

The application installed on the mobile device may be configured to send instructions for changing the behaviour of the smoking substitute device to the smoking substitute device via the wireless interface on the mobile device.

The application installed on the mobile device may be configured to send instructions for changing the behaviour of the smoking substitute device based on user input at the mobile device, e.g. via visual controls displayed on the mobile device by the application.

The application installed on the mobile device may be configured to send instructions for changing the behaviour of the smoking substitute device based on information sent to the mobile device by the smoking substitute device, e.g. if the application determines based on information sent to the mobile device by the smoking substitute device that one or more criteria have been met.

By way of example, the application could be configured to send instructions for putting the smoking substitute device in a battery saving mode of operation, if it determines from information sent to the mobile device by the smoking substitute device (e.g. concerning a number of times the smoking substitute device has been activated, e.g. since it was last charged) that one or more criteria have been met indicating that the smoking substitute device has a low battery level.

This shows one example of how the computing power of the mobile device could be leveraged to improve the functionality of the smoking substitute device.

In one example, the smoking device may be configured to wirelessly send information concerning the number of times the smoking substitute device has been activated since it was last charged to the mobile device, and the application may be configured to send instructions for putting the smoking substitute device in a battery saving mode of operation, if it determines, from the information concerning the number of times the smoking substitute device has been activated since it was last charged, that one or more criteria have been met indicating that the smoking substitute device has a low battery level.

The application installed on the mobile device may be configured to send instructions for changing the behaviour of the smoking substitute device based on instructions received from an application server. This may be useful e.g. in rolling out updated firmware to the smoking substitute device.

A third non-limiting aspect of the present disclosure provides a system according to the second non-limiting aspect of the present disclosure, wherein the mobile device is a computing device (which may or may not be a mobile device).

The present disclosure includes the combination of the aspects and particular features described except where such a combination is clearly impermissible or expressly avoided.

Aspects and embodiments of the present disclosure will now be discussed with reference to the accompanying figures. Further aspects and embodiments will be apparent to those skilled in the art. All documents mentioned in this text are incorporated herein by reference.

Figure 1:
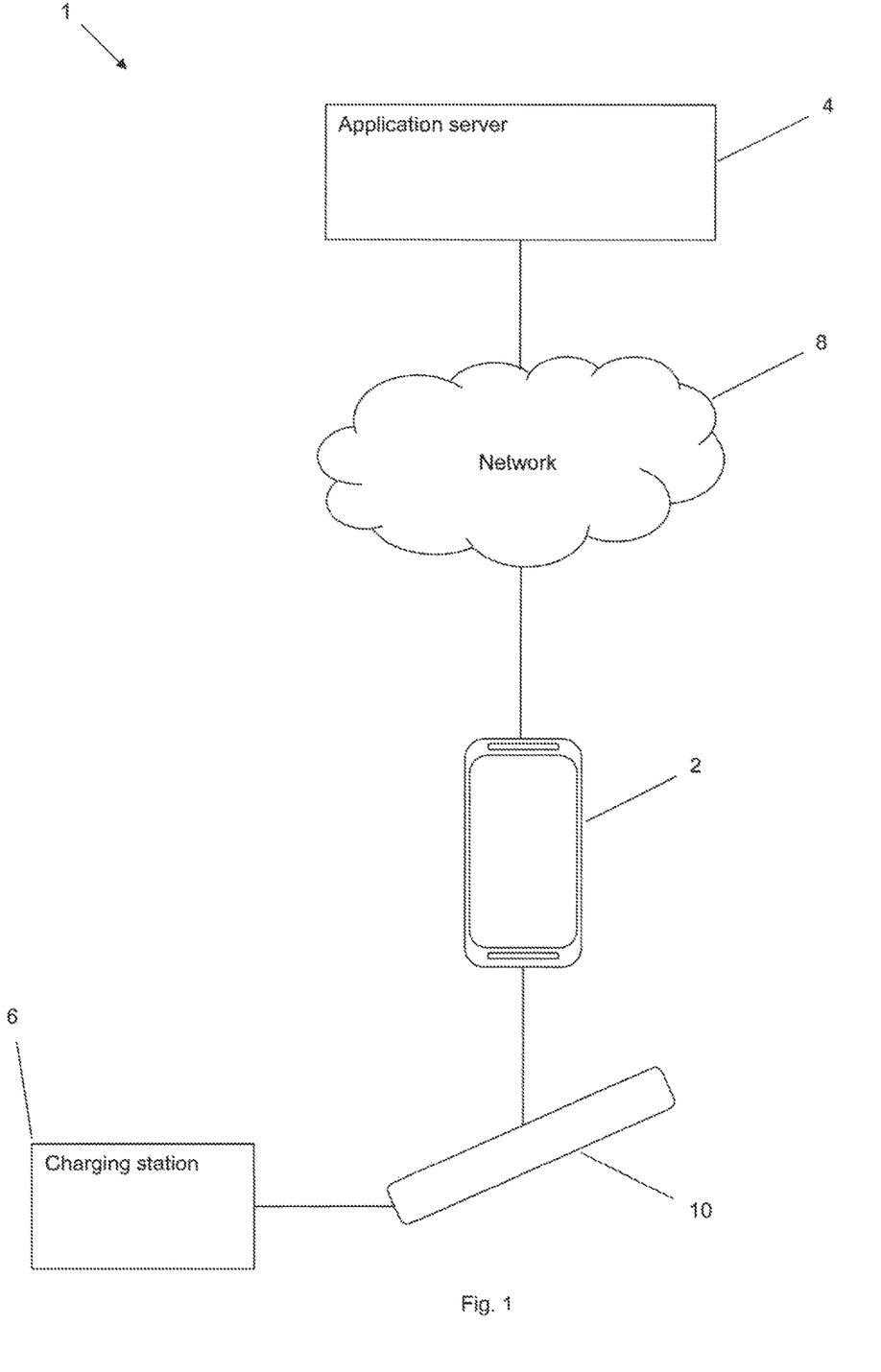
FIG. 1 shows an example system for managing a smoking substitute device.

FIG. 1 shows an example system 1 for managing a smoking substitute device 10.

The system 1 as shown in FIG. 1 includes a mobile device 2, an application server 4, an optional charging station 6, as well as the smoking substitute device 10.

The smoking substitute device 10 is configured to communicate wirelessly, e.g. via Bluetooth™, with an application (or "app") installed on the mobile device 2, e.g. via a suitable wireless interface (not shown) on the mobile device 2. The wireless connection between the smoking substitute device 10 and the mobile device may be occasional, or intermittent. The mobile device 2 may be a mobile phone, for example. The application on the mobile phone is configured to communicate with the application server 4, via a network 8. The application server 4 may utilise cloud storage, for example.

The network 8 may include a cellular network and/or the internet.

A skilled person would readily appreciate that the mobile device 2 may be configured to communicate via the network 8 according to various communication channels, such as (but not limited to) a wireless communication channel such as via a cellular network (e.g. according to a standard protocol, such as 3G or 4G) or via a WiFi network.

The app installed on the mobile device and the application server 4 may be configured to assist a user with their smoking substitute device 10, based on information communicated between the smoking substitute device 10 and the app and/or information communicated between the app and the application server 4.

The charging station 6 (if present) may be configured to charge (and optionally communicate with) the smoking substitute device 10, via a charging port on the smoking substitute device 10. The charging port on the smoking substitute device 10 may be a USB port, for example, which may allow the smoking substitute device to be charged by any USB-compatible device capable of delivering power to the smoking substitute device 10 via a suitable USB cable (in this case the USB-compatible device would be acting as the charging station 6). Alternatively, the charging station could be a docking station specifically configured to dock with the smoking substitute device 10 and charge the smoking substitute device 10 via the charging port on the smoking substitute device 10.

Figure 2A:
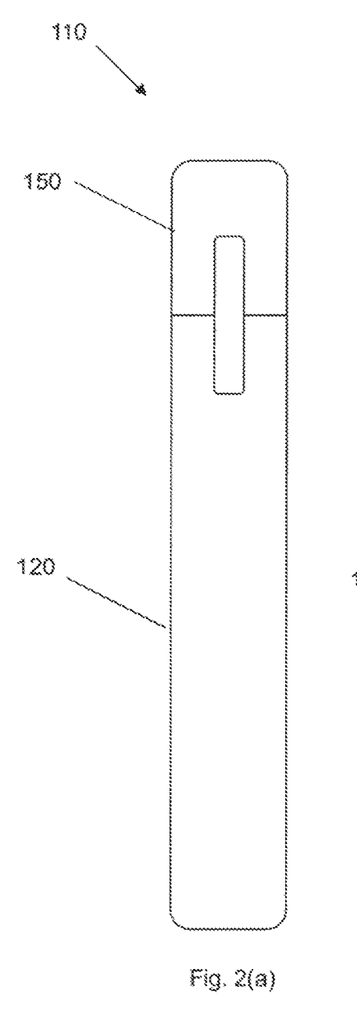
FIG. 2(a) shows an example smoking substitute device for use as the smoking substitute device in the system of FIG. 1.

FIG. 2(a) shows an example smoking substitute device 110 for use as the smoking substitute device 10 in the system 1 of FIG. 1.

In this example, the smoking substitute device 110 includes a main body 120 and a consumable 150. The consumable 150 may alternatively be referred to as a "pod".

In this example, the smoking substitute device 110 is a closed system vaping device, wherein the consumable 150 includes a sealed tank 156 and is intended for one-use only.

Figures 2B, 2C:
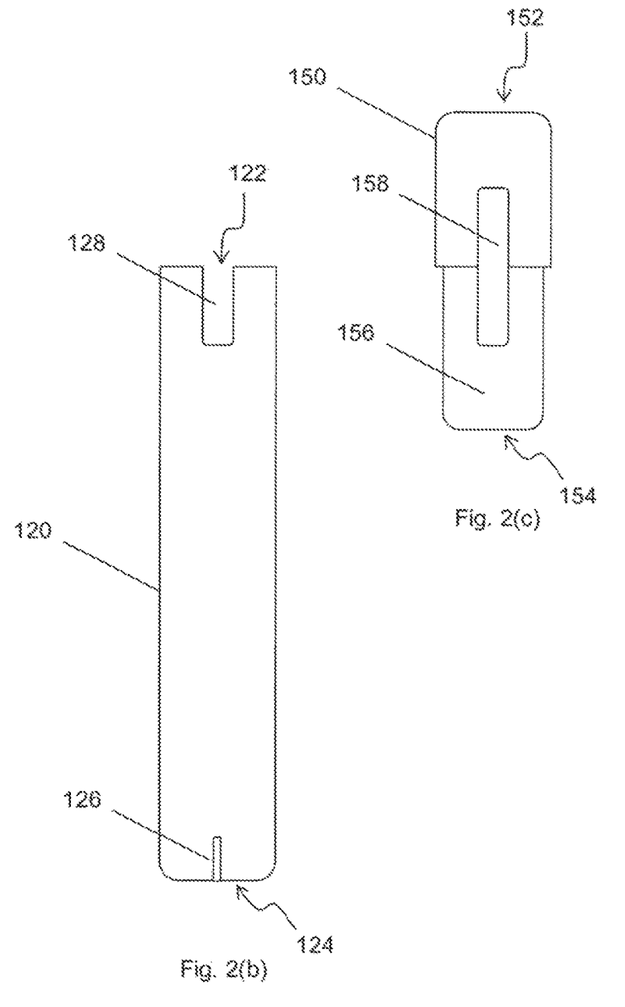
FIG. 2(b) shows the main body of the smoking substitute device of FIG. 2(a) without the consumable.
FIG. 2(c) shows the consumable of the smoking substitute device of FIG. 2(a) without the main body.

FIG. 2(a) shows the smoking substitute device 110 with the main body 120 physically coupled to the consumable 150. FIG. 2(b) shows the main body 120 of the smoking substitute device 110 without the consumable 150.

FIG. 2(c) shows the consumable 150 of the smoking substitute device 110 without the main body 120.

The main body 120 and the consumable 150 are configured to be physically coupled together, in this example by pushing the consumable 150 into an aperture in a top end 122 of the main body 120. In other examples, the main body 120 and the consumable could be physically coupled together by screwing one onto the other, or through a bayonet fitting, for example. An optional light 126, e.g. an LED located behind a small translucent cover, is located a bottom end 124 of the main body 120. The light 126 may be configured to illuminate when the smoking substitute device 110 is activated.

The consumable 150 includes a mouthpiece (not shown) at a top end 152 of the consumable 150, as well as one or more air inlets (not shown in FIG. 2) so that air can be drawn into the smoking substitute device 110 when a user inhales through the mouthpiece. At a bottom end 154 of the consumable 150, there is located a tank 156 that contains e-liquid. The tank 156 may be a translucent body, for example.

In certain non-limiting embodiments, the tank 156 includes a window 158, so that the amount of e-liquid in the tank 156 can be visually assessed. The main body 120 includes a slot 128 so that the window 158 of the consumable 150 can be seen whilst the rest of the tank 156 is obscured from view when the consumable 150 is inserted into the aperture in the top end 122 of the main body 120.

The tank 156 may be referred to as a "clearomizer" if it includes a window 158, or a "cartomizer" if it does not.

Figure 3A:
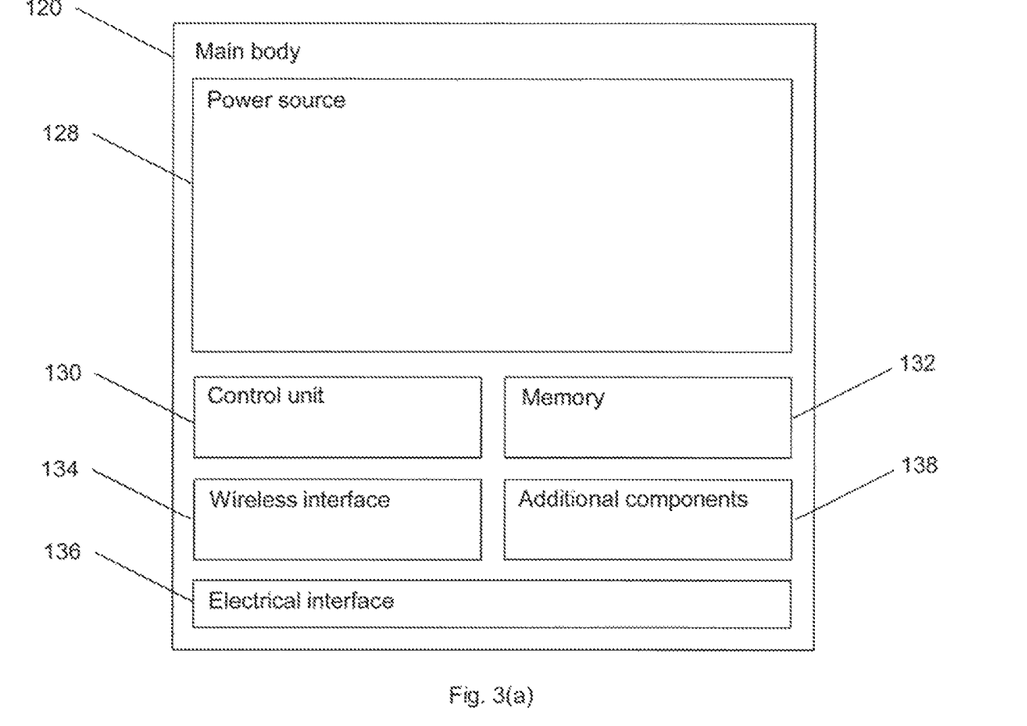
FIG. 3(a) is a schematic view of the main body of the smoking substitute device of FIG. 2(a).

FIG. 3(*a*) is a schematic view of the main body 120 of the smoking substitute device 110.

Figure 3B:
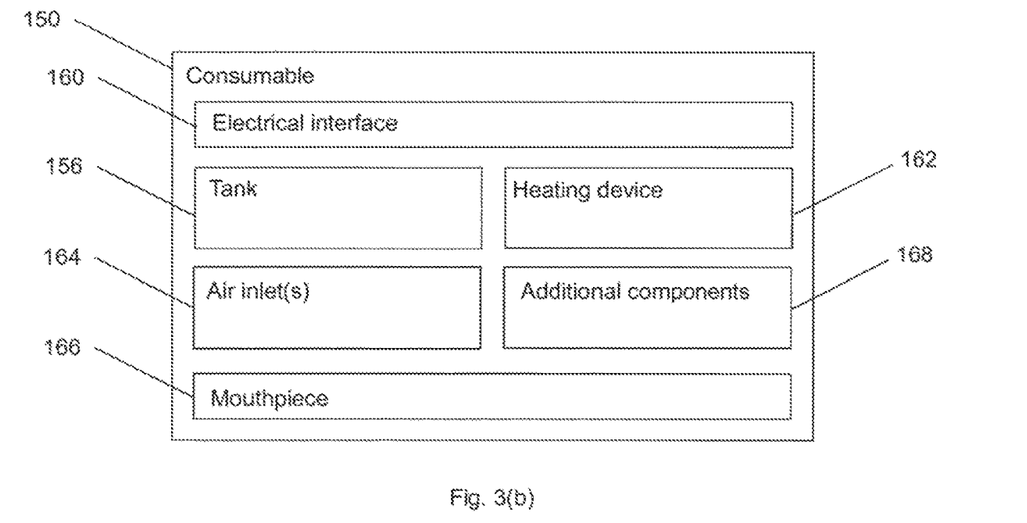
FIG. 3(b) is a schematic view of the consumable of the smoking substitute device of FIG. 2(a).

FIG. 3(*b*) is a schematic view of the consumable 150 of the smoking substitute device 110.

As shown in FIG. 3(*a*), the main body 120 includes a power source 128, a control unit 130, a memory 132, a wireless interface 134, an electrical interface 136, and, optionally, one or more additional components 138.

In certain non-limiting embodiments, the power source 128 is a battery, such as (but not limited to) a rechargeable battery.

The control unit 130 may include a microprocessor, for example.

In certain non-limiting embodiments, the memory 132 includes non-volatile memory.

In certain non-limiting embodiments, the wireless interface 134 is configured to communicate wirelessly with the mobile device 2, e.g. via Bluetooth. To this end, the wireless interface 134 could include a Bluetooth™ antenna. Other wireless communication interfaces, e.g. WiFi, are also possible.

The electrical interface 136 of the main body 120 may include one or more electrical contacts. The electrical interface 136 may be located in, and in certain particular (but non-limiting) embodiments at the bottom of, the aperture in the top end 122 of the main body 120. When the main body 120 is physically coupled to the consumable 150, the electrical interface 136 may be configured to pass electrical power from the power source 128 to (e.g. a heating device of) the consumable 150 when the smoking substitute device 110 is activated, e.g. via the electrical interface 160 of the consumable 150 (discussed below). When the main body 120 is not physically coupled to the consumable 150, the electrical interface may be configured to receive power from the charging station 6.

The additional components 138 of the main body 120 may include the optional light 126 discussed above.

The additional components 138 of the main body 120 may, if the power source 128 is a rechargeable battery, include a charging port configured to receive power from the charging station 6. This may be located at the bottom end 124 of the main body 120. Alternatively, the electrical interface 136 discussed above is configured to act as a charging port configured to receive power from the charging station 6 such that a separate charging port is not required.

The additional components 138 of the main body 120 may, if the power source 128 is a rechargeable battery, include a battery charging control circuit, for controlling the charging of the rechargeable battery. However, a battery charging control circuit could equally be located in the charging station 6 (if present).

The additional components 138 of the main body 120 may include an airflow sensor for detecting airflow in the smoking substitute device 110, e.g. caused by a user inhaling through a mouthpiece 166 (discussed below) of the smoking substitute device 110. The smoking substitute device 110 may be configured to be activated when airflow is detected by the airflow sensor. This optional sensor could alternatively be included in the consumable 150 (though this is less desired where the consumable 150 is intended to be disposed of after use, as in this example).

The additional components 138 of the main body 120 may include an actuator, e.g. a button. The smoking substitute device 110 may be configured to be activated when the actuator is actuated. This provides an alternative to the airflow sensor noted, as a mechanism for activating the smoking substitute device 110.

As shown in FIG. 3(*b*), the consumable 150 includes the tank 156, an electrical interface 160, a heating device 162, one or more air inlets 164, a mouthpiece 166, and, optionally, one or more additional components 168.

The electrical interface 160 of the consumable 150 may include one or more electrical contacts. In certain non-limiting embodiments, the electrical interface 136 of the main body 120 and an electrical interface 160 of the consumable 150 are configured to contact each other and therefore electrically couple the main body 120 to the consumable 150 when the main body 120 is physically coupled to the consumable 150. In this way, electrical energy (e.g. in the form of an electrical current) is able to be supplied from the power source 128 in the main body 120 to the heating device 162 in the consumable 150.

In certain non-limiting embodiments, the heating device 162 is configured to heat e-liquid contained in the tank 156, e.g. using electrical energy supplied from the power source 128. In one example, the heating device 162 may include a heating filament and a wick, wherein a first portion of the wick extends into the tank 156 in order to draw e-liquid out from the tank 156, and wherein the heating filament coils around a second portion of the wick located outside the tank 156. In this example, the heating filament is configured to heat up e-liquid drawn out of the tank 156 by the wick to produce an aerosol vapour.

In certain non-limiting embodiments, the one or more air inlets 164 are configured to allow air to be drawn into the smoking substitute device 110, when a user inhales through the mouthpiece 166.

In use, a user activates the smoking substitute device 110, e.g. through actuating an actuator included in the main body 120 or by inhaling through the mouthpiece 166 as described above. Upon activation, the control unit 130 may supply electrical energy from the power source 128 to the heating device 162 (via electrical interfaces 136, 166), which may cause the heating device 162 to heat e-liquid drawn from the tank 156 to produce a vapour which is inhaled by a user through the mouthpiece 166.

Of course, a skilled reader would readily appreciate that the smoking substitute device 110 shown in FIGS. 2(*a*), 2(*b*), and 2(*c*) and FIGS. 3(*a*) and 3(*b*) shows just one example implementation of a smoking substitute device, and that other forms of smoking substitute device could be used as the smoking substitute device 10 of FIG. 1.

By way of example, a HNB smoking substitute device including a main body and a consumable could be used as the smoking substitute device 10 of FIG. 1, instead of the smoking substitute device 110. One such HNB smoking substitute device is the IQOS™ smoking substitute device discussed above.

As another example, an open system vaping device which includes a main body, a refillable tank, and a mouthpiece could be used as the smoking substitute device 10 of FIG. 1, instead of the smoking substitute device 110. One such open system vaping device is the blu PRO™ e-cigarette discussed above.

As another example, an entirely disposable (one use) smoking substitute device could be used as the smoking substitute device 10 of FIG. 1, instead of the smoking substitute device 110.

In use, the control unit 130 may be configured to record information relating to usage of the smoking substitute device 110 (see above) in the memory 132 of the smoking substitute device 110.

In certain non-limiting embodiments, the smoking substitute device 110 is configured to send information relating to usage of the smoking substitute device 110 wirelessly to the mobile device 2 using the wireless interface 134 on the smoking substitute device 110 and a corresponding wireless interface (not shown) on the mobile device 2.

Various examples of information relating to usage of the smoking substitute device 110 that could be sent to the mobile device 2 have already been described in detail above. Such information may include, for example, any one or more of the following: statistics relating to usage of the smoking substitute device 110; information relating to or describing a number of times the smoking substitute device 110 has been activated; information relating to or describing one or more lengths of time for which the smoking substitute device 110 has been activated; information relating to or describing one or more flavours used with the smoking substitute device 110; information relating to or describing one or more flavours of consumable used with the smoking substitute device 110; and/or information relating to or describing the time at which one or more events occur on the smoking substitute device 110.

In certain non-limiting embodiments, the smoking substitute device 110 is configured to change its behaviour based on instructions from the mobile device 2 that have been received wirelessly at the wireless interface 134.

Again, examples of instructions that could be received at the wireless interface 134 from the mobile device 2 have already been described in detail above. Such instructions may include, for example, any one or more of the following: instructions for controlling the behaviour of the heating device 162 included in the smoking substitute device 110; instructions for changing a mode of operation of the smoking substitute device 110; instructions for resetting the smoking substitute device 110; instructions for changing the behaviour of the light 126 (if included) in the smoking substitute device 110; instructions for changing the behaviour of the airflow sensor (if included) for detecting airflow in the smoking substitute device 110; and/or instructions for controlling wireless settings of the smoking substitute device 110.

The application installed on the mobile device 2 may be configured to send instructions for changing the behaviour of the smoking substitute device 110 based on user input at the mobile device 2, e.g. via visual controls displayed on the mobile device 2 by the application.

The application installed on the mobile device 2 may be configured to send instructions for changing the behaviour of the smoking substitute device 110 based on information sent to the mobile device 2 by the smoking substitute device 110, e.g. if the application determines based on information sent to the mobile device 2 by the smoking substitute device that one or more criteria have been met.

By way of example, the application could be configured to send instructions for putting the smoking substitute device 110 in a battery saving mode of operation, if it determines from information sent to the mobile device 2 by the smoking substitute device 110 (e.g. concerning a number of times the smoking substitute device 110 has been activated, e.g. since it was last charged) that one or more criteria have been met indicating that the smoking substitute device 110 has a low battery level.

Thus, the application may infer the existence of a low battery level without requiring a step of measuring the actual battery level. Moreover, if the existence of a low battery level has been inferred, the smoking substitute deice can be put in a battery saving mode of operation.

Putting the smoking substitute device in a battery saving mode of operation may involve, for example, putting the smoking substitute device in a mode of operation in which the amount of electrical power supplied to the heating device 162 of the consumable 150 is reduced when the smoking substitute device is activated (compared with a previous mode of operation), in order to reduce the rate at which the remaining electrical energy stored by the battery 128 is used up. Other battery saving modes of operation could be envisaged by a skilled person.

Various criteria by which the application could infer that the smoking substitute device 110 has a low battery level may be envisaged by a skilled person. For example, the application could be configured to infer that the smoking substitute device 110 has a low battery level if the number of times the smoking substitute device 110 has been activated since it was last charged exceeds a threshold number.

The application installed on the mobile device may be configured to send instructions for changing the behaviour of the smoking substitute device 110 based on instructions received from the application server 4. This may be useful e.g. in rolling out updated firmware to the smoking substitute device 110.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the present disclosure in diverse forms thereof.

While the present disclosure has been described in conjunction with the exemplary embodiments described above, many equivalent modifications and variations will be apparent to those skilled in the art when given this disclosure. Accordingly, the exemplary embodiments of the present disclosure set forth above are considered to be illustrative and not limiting. Various changes to the described embodiments may be made without departing from the spirit and scope of the present disclosure.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

The invention claimed is:

1. A system for managing a smoking substitute device, the system comprising:
    a smoking substitute device; and
    a mobile device, wherein the smoking substitute device is configured to communicate wirelessly with an application installed on the mobile device via a wireless interface on the mobile device;
    wherein:
        the smoking device is configured to wirelessly send information concerning the number of times the smoking substitute device has been activated since it was last charged to the mobile device; and
        the application is configured to send instructions for putting the smoking substitute device in a battery saving mode of operation, if it determines, from the information concerning the number of times the smoking substitute device has been activated since it was last charged, that one or more criteria have been met, indicating that the smoking substitute device has a low battery level.

2. The system according to claim 1, further comprising an application server, wherein the application on the mobile device is configured to communicate with the application server via a network.

3. The system according to claim 1, wherein the application installed on the mobile device is configured to display information relating to usage of the smoking substitute device.

4. The system according to claim 1, wherein the smoking substitute device comprises:
    a control unit including a microprocessor for controlling operation of the smoking substitute device; and
    a memory for storing information relating to operation of the smoking substitute device.

5. The system according to claim 4, wherein the control unit is configured to record information concerning the number of times the smoking substitute device has been activated since it was last charged in the memory.

6. The system according to claim 1, wherein the wireless interface is configured to communicate wirelessly with the mobile device intermittently.

7. The system according to claim 1, wherein the smoking substitute device is a vaping smoking substitute device or a heat not burn smoking substitute device.

8. The system according to claim 1, wherein the application installed on the mobile device is configured to send, via the wireless interface, instructions for changing the behaviour of the smoking substitute device based on user input at the mobile device.

* * * * *

UNITED STATES PATENT AND TRADEMARK OFFICE
CERTIFICATE OF CORRECTION

Page 1 of 1

PATENT NO. : 12,089,653 B2
APPLICATION NO. : 17/001185
DATED : September 17, 2024
INVENTOR(S) : Daniel Fard and Oliver Talbot It is certified that error appears in the above-identified patent and that said Letters Patent is hereby corrected as shown below:

In the Specification

Column 2, Line 45: Delete "PROT™ e-cigarette. The blu PROT™" and replace with -- PRO™ e-cigarette. The blu PRO™ --

Signed and Sealed this
Nineteenth Day of November, 2024

Katherine Kelly Vidal
*Director of the United States Patent and Trademark Office*